W. F. KOPER.
HOSE COUPLING.
APPLICATION FILED JULY 10, 1908.
939,036.
Patented Nov. 2, 1909.
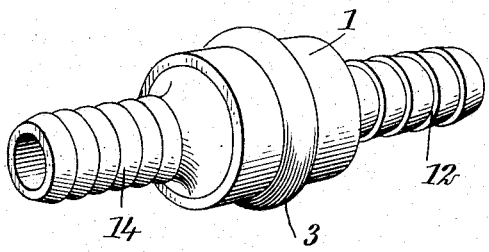
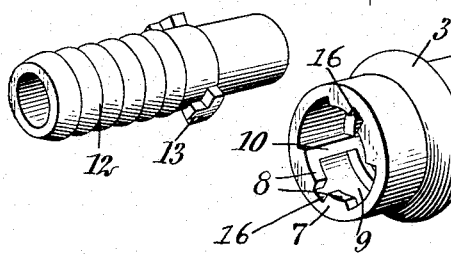
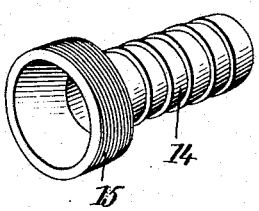
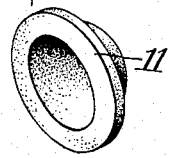
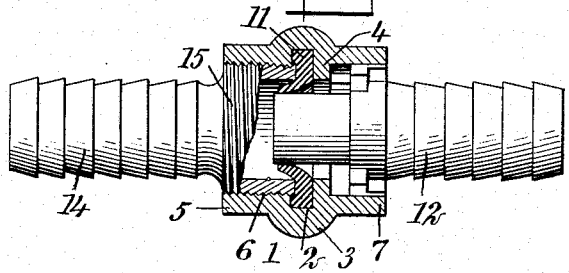
WITNESSES
INVENTOR
William F. Koper
BY
ATTORNEYS

UNITED STATES PATENT OFFICE.

WILLIAM FREDRIC KOPER, OF CHILLICOTHE, OHIO, ASSIGNOR OF ONE-HALF TO FRANK MARZLUFF, OF CHILLICOTHE, OHIO.

HOSE-COUPLING.

939,036.  Specification of Letters Patent.  Patented Nov. 2, 1909.

Application filed July 10, 1908. Serial No. 442,850.

*To all whom it may concern:*

Be it known that I, WILLIAM F. KOPER, a citizen of the United States, and a resident of Chillicothe, in the county of Ross and State of Ohio, have invented a new and Improved Hose-Coupling, of which the following is a full, clear, and exact description.

My invention relates to hose couplings and has for its object to provide a coupling for hose, which consists of four members which are constructed and are assembled as follows: A cylinder is provided which serves as a union member, the cylinder having an annular inner chamber, in which is disposed the rim of a rubber cup. At one end of the cylinder there is an inner screw thread which is less in diameter than the annular chamber. The tail piece, or pipe, is screwed to this end of the cylinder after the rubber cup has been placed in position against the interior flange with its rim in the annular chamber. The head piece or pipe has T-shaped members diametrically disposed on its exterior and the cylinder or union member has divided lugs oppositely disposed on its interior, the T-shaped member being adapted to lock with the divided lugs. It will thus be seen that when the rubber cup is in position, and the head piece or pipe is locked with the union member, with its terminal projecting through and in close engagement with the cup, the tail piece may be screwed into the union member and the fluid will occupy any space between the tail piece and the cup, the fluid pressing the cup against the head piece.

In this specification I will describe the preferred form of my invention, but I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a perspective view of the coupling with the several members locked in position; Fig. 2 is a perspective view of the head piece; Fig. 3 is a perspective view of the union member; Fig. 4 is a perspective view of the tail piece; Fig. 5 is a perspective view of the rubber cup; and Fig. 6 is a side elevation of the coupling shown in Fig. 1 with the union member in section to show the relative positions of the members.

By referring to the drawings, it will be seen that a union member 1 has an annular chamber 2 therein, and in order to preserve the strength of the union member, an annular rim 3 is formed on the outer surface of the coupling, which corresponds with the annular chamber 2 and preserves the even thickness of the coupling from terminal to terminal. On the interior of the union member 1 there is annular flange 4, the continuation of one side of which forms one side of the annular chamber 2. Between the annular chamber 2 and a terminal 5 of the union member, there is an inner screw thread 6, the diameter of the inner screw thread being greater than the diameter of the annular flange 4 and less than the diameter of the annular chamber 2. At the other terminal 7 of the union member 1, lugs 8 are disposed on its inner face, two lugs being arranged close together on opposite sides of the interior of the union member 1, each pair of lugs being separated by a slot 9, and a longitudinal lug 10 being disposed between one of the ends of each of the pair of lugs 8 and the annular flange 4. A cup 11, having a rim which is adapted to fit the annular chamber 2, is provided, the cup being adapted to lie against the annular flange 4. The head piece 12 has T-shaped members 13, the T-shaped members being disposed at opposite sides of the exterior of the head piece 12 and being so constructed that they will fit and lock with the lugs 8; and the stem of the T-shaped members is disposed longitudinally of the head piece, fitting the slots 16 between the lugs 8. When the head piece 12 is in position and is locked with the union member 1, the inner terminal of the head piece will protrude through an opening in the rubber cup 11 and the rubber cup will fit close against the head piece 12 to prevent any leakage. The tail piece 14 has a screw thread 15 which is adapted to mesh with the thread 6 in the union member 1, firmly holding the rubber cup in position and making the tail piece the union and the rubber a permanent fixture.

In using my invention, the head piece is introduced in the terminal 7 of the union member 1, and it is rotated therein until the stems of the T-shaped members are in alinement with the slots 9, when the head piece is pulled outwardly until the T-shaped members interlock with the lugs 8. In this position the head piece 12 protrudes through the opening in the rubber cup 11.

Having thus described my invention, I claim as new and desire to secure by Letters Patent:

1. A hose coupling, comprising a union member having one end internally screw threaded and provided on the inner face of the other end with pairs of oppositely arranged lugs, the said member having an internal flange intermediate of its ends, a resilient apertured gasket resting against the flange of the union member, a tail piece screwing into one end of the union member into engagement with the flange of the gasket, and a head piece having a plain cylindrical inner end projecting into the aperture of the gasket and provided adjacent to said end with oppositely arranged T-shaped lugs engaging the lugs of the union member with their stems extending between the pairs of lugs.

2. In a hose coupling a union member having on its inner face at one end pairs of oppositely arranged lugs, a resilient apertured gasket held in the union member, a tail piece secured in one end of the union member in engagement with the packing, and a head piece having a plain cylindrical inner end and projecting into the aperture of the packing and provided adjacent to said end with oppositely arranged T-shaped lugs engaging the lugs of the union member with their stems extending between the pairs of lugs.

3. In a hose coupling, a union member having an annular interior flange intermediate of its ends and provided at one end on its inner face with pairs of oppositely arranged lugs and a longitudinal lug connecting one lug of each pair of lugs with the said flange, and a pipe provided adjacent to its inner end with oppositely arranged T-shaped lugs engaging the pairs of lugs of the union member with their stems extending between the said lugs.

In testimony whereof I have signed my name to this specification in the presence of two subscribing witnesses.

WILLIAM FREDRIC KOPER.

Witnesses:
JOHN COLAND,
MAY FINDLEY.